(12) United States Patent
Griffith et al.

(10) Patent No.: US 8,019,716 B2
(45) Date of Patent: Sep. 13, 2011

(54) REFLECTIVE PROCESSING OF TMK HIERARCHIES

(75) Inventors: Todd William Griffith, Williamsport, PA (US); Robert Douglas Ross, Williamsport, PA (US); Brian Joseph Rogosky, Williamsport, PA (US); Jason Randolph Potts, Williamsport, PA (US)

(73) Assignee: Discovery Machine, Inc., Williamsport, PA (US)

( * ) Notice: Subject to any disclaimer, the term of this patent is extended or adjusted under 35 U.S.C. 154(b) by 911 days.

(21) Appl. No.: 11/781,671

(22) Filed: Jul. 23, 2007

(65) Prior Publication Data

US 2010/0268676 A1 Oct. 21, 2010

Related U.S. Application Data

(60) Provisional application No. 60/832,819, filed on Jul. 24, 2006.

(51) Int. Cl.
*G06F 17/00* (2006.01)
*G06N 7/08* (2006.01)
*G06N 5/02* (2006.01)
(52) U.S. Cl. .......................................... 706/59; 706/50
(58) Field of Classification Search ........................ None
See application file for complete search history.

(56) References Cited

U.S. PATENT DOCUMENTS

| 6,535,863 | B1 * | 3/2003 | O'Reilly | 706/45 |
|---|---|---|---|---|
| 7,257,455 | B1 * | 8/2007 | Griffith et al. | 700/104 |
| 7,644,052 | B1 * | 1/2010 | Chang et al. | 706/45 |
| 7,752,608 | B1 * | 7/2010 | Hinchey et al. | 717/136 |
| 7,757,220 | B2 * | 7/2010 | Griffith et al. | 717/136 |
| 2004/0122788 | A1 * | 6/2004 | Griffith et al. | 706/61 |
| 2006/0101424 | A1 * | 5/2006 | Griffith et al. | 717/136 |

OTHER PUBLICATIONS

O'Keefe et al.; "Expert system verification and validation: A survey and tutorial"; 1993; Kluwer Academic Publishers; Artificial Intelligence Review 7; pp. 3-42.*

\* cited by examiner

*Primary Examiner* — Jeffrey A Gaffin
*Assistant Examiner* — Stanley K Hill
(74) *Attorney, Agent, or Firm* — Haynes and Boone, LLP

(57) ABSTRACT

A method for the automatic examination of knowledge system hierarchies is disclosed. A target TMK hierarchy is represented as a plurality of records in a database. A second TMK hierarchy (a "critic") is constructed of tasks, subtasks, methods, procedures and actions. The critic hierarchy includes actions that retrieve and examine at least one record of the database representing the target hierarchy. The examination of the record provides a result. The result is of the form of a modification of the processing within the critic hierarchy or of the form of a report or a modification of the target hierarchy's elements, namely, tasks, methods, procedures, actions, class structures, or the relationship between the elements.

20 Claims, 8 Drawing Sheets

| FUNCTION NAME | DESCRIPTION |
|---|---|
| GETALLTASKS() | THIS FUNCTION WILL QUERY THE TASK COLLECTION FOR A LIST OF ALL OF ITS TASKS. THEN EACH TASK WILL BE QUERIED FOR ITS NAME, AND AN ARRAY OF THESE NAMES WILL BE RETURNED. IN THE TOOL, THIS WILL BE HANDLED AS A COLLECTION. |
| GETALLMETHODS() | SAME AS GET ALL TASKS FOR METHODS. |
| GETALLPROCEDURES() | SAME AS GET ALL TASKS FOR PROCEDURES. |
| GETCHILDMETHODS(STRING TASKNAME) | THIS WILL GET THE TASK WITH THE SPECIFIED NAME FROM THE COLLECTION, GET ITS CHILD METHODS, THEN RETURN AN ARRAY OF THEIR NAMES. |
| GETCHILDPROCEDURES(STRING TASKNAME) | THIS WILL GET THE TASK WITH THE SPECIFIED NAME FROM THE COLLECTION, GET ITS CHILD PROCEDURES, THEN RETURN AN ARRAY OF THEIR NAMES. |
| GETSUCCESSCONDITION(STRING TASKNAME) | GETS THE TASK WITH SPECIFIED NAME FROM THE COLLECTION, AND RETURNS ITS CONDITION AS A STRING. |
| SETSUCCESSCONDITION(STRING TASKNAME, STRING CONDITION)- | GETS THE TASK WITH THE SPECIFIED NAME FROM THE COLLECTION, AND RETURNS ITS SUCCESS CONDITION AS STRING. |
| GETSUBTASKS (STRING METHODNAME) | RETURNS AS ARRAY OF TASK NAMES, THAT ARE THE SUBTASKS OF THE METHOD. |
| GETACTIONS (STRING PROCEDURENAME) | RETURNS THE ACTIONS OF A PROCEDURE AS AN ARRAY OF STRINGS. |
| GETRIGHTSIDEOFACTIONS(STRING PROCEDURENAME) | RETURNS THE RIGHT SIDES OF THE ACTIONS OF THE PROCEDURE, AS AN ARRAY OF STRINGS. |
| GETLEFTSIDEOFACTIONS(STRING PROCEDURENAME) | RETURNS THE LEFT SIDES OF THE ACTIONS OF THE PROCEDURE, AS AN ARRAY OF STRINGS. |
| GETTASKMETHODCONDITION(STRING TASKNAME, STRING METHODNAME) | GETS THE TASK AND METHOD FROM THE COLLECTIONS, AND GETS THE LINK FROM THE TASKCHILDLINKCOLLECTION, GETS ITS CONDITION, AND RETURNS IT AS A STRING. |
| GETTASKPROCEDURECONDITION(STRING TASKNAME, STRING PROCEDURENAME) | GETS THE TASK AND METHOD FROM THE COLLECTIONS, AND GETS THE LINK FROM THE TASKCHILDLINKCOLLECTION, GETS ITS CONDITION, AND RETURNS IT AS A STRING. |
| SETTASKMETHODCONDITION(STRING TASKNAME, STRING METHODNAME, STRING CONDITION) | GETS THE TASK AND METHOD FROM THE COLLECTIONS, AND GETS THE LINK FROM THE TASKCHILDLINKCOLLECTION, AND SETS ITS CONDITION. |
| SETTASKPROCEDURECONDITION(STRING TASKNAME, STRING PROCEDURENAME, STRING CONDITION) | GETS THE TASK AND METHOD FROM THE COLLECTIONS, AND GETS THE LINK FROM THE TASKCHILDLINKCOLLECTION, AND SETS ITS CONDITION. |
| HIGHLIGHTTASK(STRING TASKNAME) | HIGHLIGHTS THE SPECIFIED TASK IN THE HIERARCHY. |
| HIGHLIGHTMETHOD(STRING METHODNAME) | HIGHLIGHTS THE SPECIFIED METHOD IN THE HIERARCHY. |
| HIGHLIGHTPROCEDURE(STRING PROCEDURENAME) | HIGHLIGHTS THE SPECIFIED PROCEDURE IN THE HIERARCHY. |
| RESETVIEWS () | CLEARS ANY HIGHLIGHTS THAT ARE SET. |
| USERSELECTTASKS() | DISPLAYS A DIALOG ASKING THE USER TO SELECT TASKS FROM THE VIEWS. WHEN THE USER CLOSES THE DIALOG, AN ARRAY OF THE NAMES OF THE TASKS SELECTED IS RETURNED. |
| CLEARUNUSEDTASKVARIABLES () | REMOVES ALL VARIABLES FROM ALL TASKS, IF THE VARIABLE IS NOT USED BY THE TASK OR ITS CHILDREN. |
| CLEARUNUSEDMETHODVARIABLES () | REMOVES ALL VARIABLES FROM ALL METHODS, IF THE VARIABLE IS NOT USED BY THE METHOD OR ITS CHILDREN. |

FIG. 4A

| FUNCTION NAME | DESCRIPTION |
|---|---|
| CLEARUNUSEDPROCEDUREVARIABLE ( ) | REMOVES ALL VARIABLES FROM ALL PROCEDURES, IF THE VARIABLE IS NOT USED BY THE PROCEDURE'S ACTIONS. |
| REMOVEUNUSEDVARIABLESFROM TASK(STRING TASKNAME) | REMOVES ANY VARIABLES THAT ARE NOT USED IN THE TASK'S ACTIONS |
| REMOVEUNUSEDVARIABLESFROMMETHOD (STRING METHODNAME) | REMOVES ANY VARIABLES THAT ARE NOT USED BY THE METHOD OR ITS CHILDREN |
| REMOVEUNUSEDVARIABLESFROMPROCEDURE(STRING PROCEDURENAME) | REMOVES ANY VARIABLES THAT ARE NOT USED IN THE PROCEDURE'S ACTIONS |
| NEWTASK(STRING TASKNAME) | CREATES A NEW TASK WITH THE GIVEN NAME |
| NEWMETHOD(STRING METHODNAME) | CREATES A NEW METHOD WITH THE GIVEN NAME |
| NEWPROCEDURE(STRING PROCEDURENAME) | CREATES A NEW PROCEDURE WITH THE GIVEN NAME |
| ADDPROCEDURETOTASK(STRING PROCEDURENAME, STRING TASKNAME) | ADDS THE SPECIFIED PROCEDURE TO THE SPECIFIED TASK |
| ADDMETHODTOTASK(STRING METHODNAME, STRING TASKNAME) | ADDS THE SPECIFIED METHOD TO THE SPECIFIED TASK |
| ADDTASKTOMETHOD(STRING TASKNAME, STRING METHODNAME) | ADDS THE SPECIFIED TASK TO THE SPECIFIED PROCEDURE |
| ADDACTIONTOPROCEDURE(STRING ACTIONLEFT, STRING ACTIONRIGHT, STRING PROCEDURENAME) | ADDS AN ACTION TO THE SPECIFIED PROCEDURE |
| DELETEPROCEDUREFROMTASK(STRING PROCEDURENAME, STRING TASKNAME) | DELETES THE SPECIFIED PROCEDURE FROM THE SPECIFIED TASK |
| DELETEMETHODFROMTASK(STRING METHODNAME, STRING TASKNAME) | DELETES THE SPECIFIED METHOD FROM THE SPECIFIED TASK |
| EDITPROCEDURE(STRING PROCEDURENAME) | LAUNCHES A PROCEDURE EDITOR FOR THE SPECIFIED PROCEDURE |
| GETVARIABLERESULT(STRING PROCEDURENAME, STRING VARIABLENAME) | SEARCHES THE LOG OF THE LAST RUN, AND RETURNS AN ARRAY OF STRINGS FOR ALL OF THE RESULTING VALUES PLACED INTO THAT VARIABLE |
| ADDINPUTSTRINGTOTASK(STRING INPUTNAME, STRING TASKNAME) | ADDS AN INPUT OF TYPE STRING TO THE SPECIFIED TASK, AND AUTOMAPS IT TO THE TASK'S CHILDREN |
| ADDINPUTCLASSTOTASK(STRING INPUTNAME, STRING CLASSNAME, STRING TASKNAME) | ADDS AN INPUT TO TYPE SPECIFIED TO THE SPECIFIED TASK, AND AUTOMAPS IT TO THE TASK'S CHILDREN |
| ADDOUTPUTSTRINGTOTASK(STRING INPUTNAME, STRING TASKNAME) | ADDS AN OUTPUT OF TYPE STRING TO THE SPECIFIED TASK, AND AUTOMAPS IT TO THE TASK'S CHILDREN |
| ADDPUTPUTCLASSTOTASK(STRING OUTPUTNAME, STRING CLASSNAME, STRING TASKNAME) | ADDS AN OUTPUT OF TYPE SPECIFIED TO THE SPECIFIED TASK, AND AUTOMAPS IT TO THE TASK'S CHILDREN. |

FIG. 4B

REFLECTIVE PROCESSING OF TMK HIERARCHIES

STATEMENT REGARDING FEDERALLY SPONSORED RESEARCH

This invention was made with Government support under federal contract number W31P4Q-04-C-R003 awarded by the U.S. Aviation and Missile Command. The Government has certain rights in the invention.

BACKGROUND OF THE INVENTION

1. Field of the Invention

The invention relates to computer systems in general and specifically to computer-based knowledge systems and the reflective examination of knowledge information hierarchies.

2. Description of the Related Art

Computer knowledge acquisition systems attempt to make computers an "expert" in some area by drawing knowledge from experts, encoding this knowledge for use in a computer system, and providing software programs that use this knowledge to develop solutions. The current state of the art for these programs is to have the subject matter expert working alone or with the help of a knowledge system engineer who may enter strategic knowledge information in the form of language statements or knowledge hierarchies. Several strategies and techniques exist for the entry of knowledge information. One approach utilizes a task-method-knowledge ("TMK") hierarchy that encodes problem-solving strategies in a hierarchy representing strategies developed by experts for specific problems.

TMK hierarchies are conventionally defined either as a set of textual language statements similar to a programming language such as LISP, COBOL, ALGOL, PROLOG; or they are entered into an interactive user interface and stored in a form internal to the visual entry knowledge system. In the past, a subject matter expert used a knowledge engineer to enter the knowledge. This required that the knowledge engineer work with the subject matter expert to learn the subject matter to a substantial degree, then transcribe the subject matter knowledge into a computer for processing. The success of this process is a function of the subject matter expert's ability to have the knowledge engineer understand the subject matter, and the knowledge engineer's ability to accurately translate the knowledge into the computer system. Recent developments include systems that allow the subject matter expert to enter the knowledge directly, without the use of a knowledge engineer. These systems use an interactive program into which the subject matter expert types knowledge specifications in response to prompts or training in using the software. In the example of a TMK system, the subject matter expert may be prompted or allowed to enter tasks and methods, and to specify the relationships between them, using customary computer interface techniques: mouse movements, keyboard entry, import from other data, etc. In this way, the subject matter expert enters the entire hierarchy representing the knowledge, and then using facilities of the software system, runs the knowledge hierarchy to solution. By eliminating the knowledge engineer from the process, the hierarchy can be entered and processed completely by the subject matter expert, with a resulting increase in productivity.

Subject matter experts are typically neither programmers nor knowledge engineers, however, they generally rely on the software system to accurately capture the knowledge as entered. Once entered, however, the subject matter expert has no way to decide if the entered representation is optimal or even accurate. Therefore, system relies upon skill of the knowledge engineer who entered the knowledge into the system for an efficient and accurate result representation. Generally speaking, in this process, the knowledge engineer would manually review a hierarchy and identify one or more errors or inefficiencies in the following areas of the hierarchy: First, inaccurate hierarchy structure, such as conflicting branches, branches which could not be entered, and/or branches which once entered could not be exited; Second, inefficient hierarchy structure, such as redundant, inefficient, or unnecessary branches; Third, incorrect logic, such as incorrect calculations of results or incorrect assignment of variables; Fourth, incorrect use of data, such as data type mismatch, incorrect connections between, or inefficient or incorrect use of data variables; and/or Fifth, applications, such as specific errors and inefficiencies, incorrect or inefficient use of specific heuristic calculations, or misuse of substance or connection types. Therefore, by removing the knowledge engineer from the process, the ability to inspect and critique a knowledge hierarchy is lost in current systems.

Therefore, what is needed is a method for the analysis of a subject matter expert-entered hierarchy by the software system into which the subject matter expert enters the knowledge. The process needed may be appropriately termed "reflection", where a software system "reflects" on its own processing and makes decisions about the accuracy and efficiency thereof, and offers suggestions for corrections and improvements to the software methodology based upon the reflections.

SUMMARY OF THE DISCLOSURE

One exemplary embodiment of the invention may provide a method for the construction of software critics that examine a target knowledge hierarchy and offer suggestions for corrections and improvements to the hierarchy. The critic may automatically implement changes based on its analysis without interaction with the operator, and the critic be included as part of the knowledge entry software system. The critic may further to be entered into a software system that is used by a subject matter expert who is not necessarily skilled in programming, knowledge engineering, or the analysis of hierarchies. Further still, the critic may be configured to examine its own hierarchy and offer suggested changes and improvements for user selection and implementation. In another embodiment of the invention, the user is allowed to select from the offered suggested changes and improvements and automatically apply the selection.

Exemplary embodiments of the invention also provide a method and software are that allow a computer system user to construct a software critic that will examine a knowledge base. Upon examination, the critic may provide a report or offer suggestions for change to correct errors, increase speed, and improve efficiency of the examined hierarchy. These suggestions may be offered to the operator for selection or may be automatically implemented by the critic.

Embodiments of the invention may also provide a method for using a collection of software components which construct a software critic that can be combined into a software system and caused to examine a knowledge hierarchy. The critic may provide a report or offer suggestions or changes as alternatives to the software operator or automatically apply corrections and improvements in the examined hierarchy. If offered as alternatives, the operator of the software can select from the offered suggestions and implement them in the examined hierarchy. The critic itself may be a knowledge hierarchy, and may be constructed using the tools and techniques of other knowledge hierarchies from the collection of components of embodiments of the invention. Thus the critic may include tasks, methods, or procedures as a knowledge hierarchy, and when run to solution, examine or reflect on the target hierarchy.

Embodiments of the invention may further provide a method for examining a knowledge information hierarchy. The method includes generating a TMK critic hierarchy, wherein the TMK critic hierarchy is configured to retrieve and examine the knowledge information hierarchy, and processing the TMK critic hierarchy to a solution on the knowledge information hierarchy.

Embodiments of the invention may further provide a computer program embodied on a computer readable medium, that when executed by a computer processor, is configured to control a method for examining a target TMK hierarchy. The method includes representing the target TMK hierarchy as a plurality of records in a database, and representing a critic TMK hierarchy as a plurality of records in a database, where the critic TMK hierarchy includes at least one of tasks, subtasks, methods, procedures, actions, and class structures. The method further includes retrieving and examining at least one database record representing the target TMK hierarchy with the critic TMK hierarchy, providing a solution to the critic TMK hierarchy by making a determination based on the examination, and displaying a result to a user based on the determination.

Embodiments of the invention may further provide a method for examining a target hierarchy for errors. The method includes entering and storing a target hierarchy as records in tables in a relational database, examining the records with a TMK critic hierarchy, and modifying the records representing the target hierarchy with the TMK critic hierarchy to correct an error determined in the target hierarchy.

BRIEF DESCRIPTION OF THE DRAWINGS

FIGS. 4*a* and 4*b* illustrate a plurality of exemplary software function calls that may be implemented in various exemplary embodiments of the present invention;

DETAILED DESCRIPTION OF THE DISCLOSURE

Figure 1:
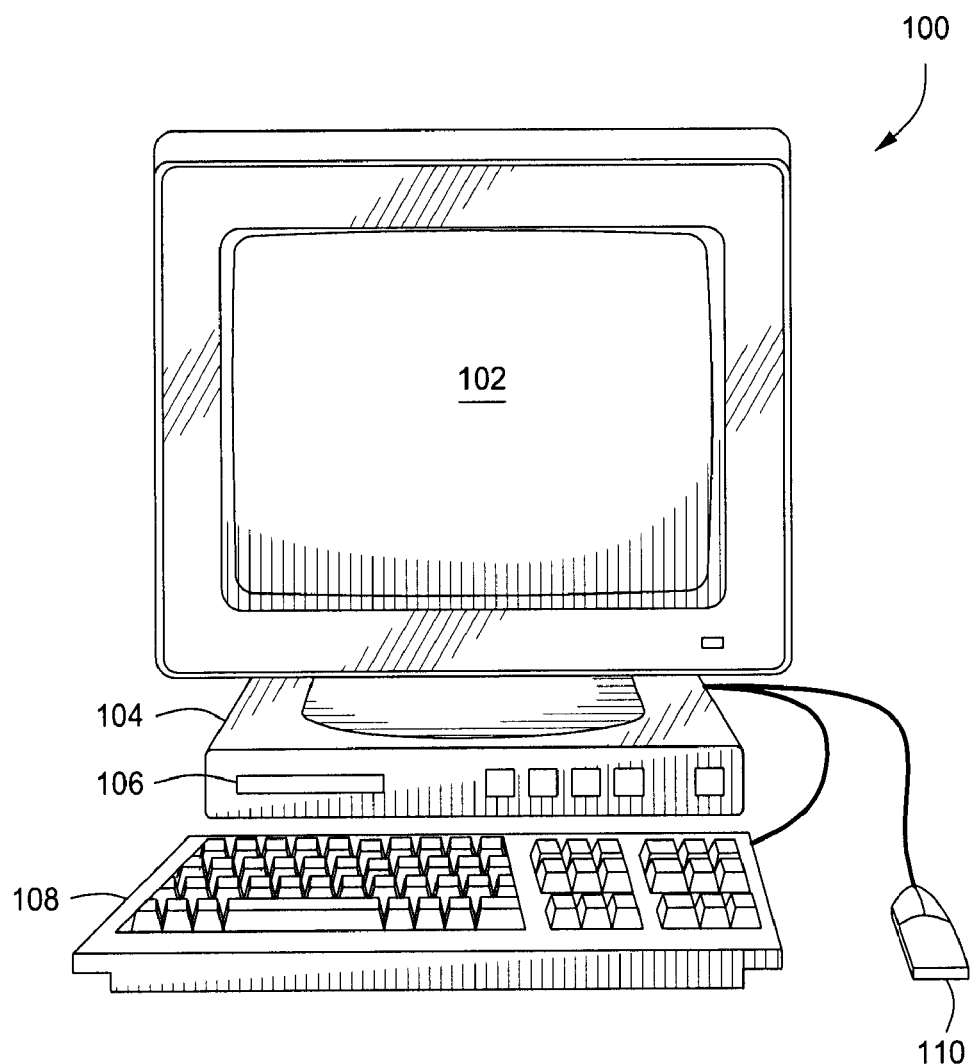
FIG. 1 illustrates an exemplary computer system configured to run or execute methods of programs of the invention.

It is to be understood that the following disclosure provides several different embodiments or examples for implementing different features of various embodiments of the invention. Specific examples of components and arrangements are described below to simplify the present disclosure. However, the examples and exemplary embodiments are, of course, merely exemplary and are not intended to be limiting upon the scope of the invention. Additionally, the present disclosure may repeat reference numerals and/or letters throughout the description of the various exemplary embodiments of the invention. However, this repetition is for the purpose of simplicity and clarity and does not in itself dictate a relationship between the various exemplary embodiments and/or configurations described herein. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. The same applied for method steps, procedures, and processes herein, i.e., the order of the steps or processes illustrated in exemplary embodiments is not intended to be limiting in that additional steps may be interstitially inserted.

Additionally, in the following, reference is made to various embodiments of the invention. However, it should be understood that the invention is not limited to any of the specifically described embodiments. Rather, the invention may include any combination of the features and elements described in the various exemplary embodiments, whether related to different embodiments or not. Furthermore, in various exemplary embodiments, the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered express elements or limitations of the appended claims, except where explicitly recited in a claim (s). Likewise, reference to "the invention" shall not be construed as a generalization of any inventive subject matter disclosed herein and shall not be considered to be an element or limitation of the appended claims except where explicitly recited in a claim(s).

One embodiment of the invention may be implemented as a program product for use with a computer system or other processing-type apparatus. The program(s) of the program product defines functions of the embodiments (the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive, hard-disk drives, writable CD-ROM drives, tape drives, and any other writable computer storage medium known in the art); or (iii) information conveyed to a computer by a communications medium, such as through a network, wireless communications. The latter embodiment specifically includes information to/from the Internet and other networks. Such computer-readable media, when carrying computer-readable instructions that direct the functions of the present invention, represent embodiments of the present invention.

In general, the routines executed to implement the embodiments of the invention may be part of an operating system or a specific application, component, program, module, object, or sequence of instructions. The computer program of the present invention typically includes of a multitude of instructions that will be translated by the native computer into a machine-readable format, and hence executable instructions. Also, programs generally include variables and data structures that either reside locally to the program or are found in memory or on storage devices in communication with the computer system or processor. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates an exemplary computer system that may be used to implement carious embodiments of the invention. The computer system 100 may be any type of computer system (IBM PC, MAC, etc.). The computer system 100 generally includes a processing unit 104, an input device 106, 108, 110, and an output device 102. The processing unit 104 may include micro-processor in communication with at least one memory device, such as a hard disk drive, a type of random access memory, or other computer readable storage medium. At least one of the memory devices in the processing unit 104 may generally be configured to store a computer program thereon in manner such that the program may be retrieved therefrom and executed by a processor. Additionally, at least one of the memory devices in the processing unit may also be configured to store data or data structures that may be used by the software program when running. The input device 108 may be a keyboard, mouse, or other input device used with computers. The input device 106 may be a disk drive configured to load data or programs onto the computer system 100. The input device 110 may be a mouse or other user selection/pointing device. The output device 102 may be a visual monitor, sound devices, or other devices used with computers. Additionally, although the components of the computer system 100 are illustrated in FIG. 1 as being a unitary component, embodiments of the invention contemplate that the components may be separated and positioned in different locations. In this embodiment, the respective components of the computer system 100 may be in communication with each other via a communication network. As such, the processing program may be resident on a memory device in location A, data used by the processing program may be resident on a memory device in location B, and the processor executing the program may be running on a processor in location C, where at least location C is in communication with locations A and B.

One exemplary embodiment of the invention may include a computer system having a computer processor and application software (stored in a memory) configured to be run on the processor. Such a system has input and output hardware for the entry (keyboard, mouse, touch pad, etc.), display (computer monitor, etc.), and output (printer, optical and magnetic media, etc.) of information under the control of the application software. Standard interface conventions may be used for interacting with the computer operator to display and request the input of information. For example, the use of windows, dialog boxes, message text, data entry fields, prompting and help information, are all well-known and in common use in computer software applications.

The exemplary computer system may include software configured to support visual entry, review, and modification of knowledge hierarchies. In some embodiments of the invention, a knowledge hierarchy may generally refer to a decomposition of tasks into subtasks through what is often termed a hierarchical transition network (HTN). A "knowledge hierarchy" is formed when you have multiple decompositions of these tasks through methods, and therefore, for each exemplary task there are generally one or more methods that can be used to accomplish the exemplary task. Each method contains or generally points to a set of subtasks that are generally needed to carry out the method's parent task, as well as the ordering for those subtasks. Thus, an exemplary method of the invention will provide the collection of subtasks as well as their order of execution. A hierarchy is formed and the subtasks are broken down even further using the various exemplary methods and embodiments of the invention. The tree generally bottoms out in primitive methods called procedures that are the leaves of the knowledge hierarchy. Therefore, the elements of the knowledge hierarchy are generally tasks, methods, and procedures, where each element can have parameters that contain data. This data is the knowledge that flows through the hierarchy and is manipulated and changed by the hierarchy. Such a system allows the entry of hierarchies via interactions with the computer operator such that the resulting hierarchy is stored as data, generally on magnetic media in a format known to and used by the controlling software and in communication with the processor running the controlling software. In such a system, a previously defined and saved hierarchy may be recalled, reviewed, and if altered saved again for subsequent review and processing. The saved hierarchies generally have names or other identifying characteristics that allow the operator to select the desired hierarchy from the set of saved hierarchies. The hierarchy is represented in the computer as a collection of data that can be available to other software other than the knowledge entry system.

A TMK hierarchy generally includes tasks, methods, and procedures related in a parent-child hierarchy. The solution of a TMK hierarchy starts with input conditions to a high-level task and a desired output condition. Processing proceeds through the TMK hierarchy as a solution is sought, flowing from parent to child according to the conditions and programming of the tasks, methods, and procedures. If a solution is found, processing stops and the solution is displayed. If no solution is found in what is generally a predetermined period of time (depending upon the size of the hierarchy), the processing may be stopped with an appropriate messages displayed to the user.

In an exemplary embodiment of the invention, a hierarchy to be critiqued, which is generally referred to as a target hierarchy, is entered by the subject matter expert following the practice and techniques available in the art. The entered hierarchy is generally stored as records in tables in a relational data base. A critic may be defined as a knowledge hierarchy that uses another knowledge hierarchy as its data (or knowledge). The critic passes a target knowledge hierarchy (or the data that makes up that hierarchy) and can then manipulate and change the target hierarchy. A critic in a TMK hierarchy may itself be a TMK hierarchy including tasks, methods, and procedures.

Software which performs this reflection is called a "critic". A critic may offer suggestions and alternatives to a human operator for selection, or may automatically make additions, deletions, and other changes to the hierarchy or data used therein. A knowledge-entry system, used by the subject matter expert without the need for a knowledge engineer, which then reflects on the entered knowledge and offers suggestions for correction and improvement, would allow for the creation of accurate and optimized knowledge hierarchies. Additionally, a software critic may generally be defined as a knowledge hierarchy that uses another knowledge hierarchy as its data (or knowledge). The software critic passes a target knowledge hierarchy (or the data that makes up that hierarchy) and can then manipulate and change the target hierarchy. Software critics are, however, difficult to design and implement, as the nature of programming languages is that while they have structure and syntax, they also allow a great deal of freedom for the programmer to write code to solve a given problem in any number of ways. Said another way, programming languages are by their nature generalized and useful for programs unanticipated by the language developers. Each program written could be considered to be just one instance of a large number of possible programs written to perform the same task or solve the same problem. Given the programming variations and freedoms, the construction of critics is difficult, if not impossible.

To distinguish between, standard hierarchies and TMK hierarchies, Applicants note that while a standard hierarchy deals with the subject matter of the encoded knowledge, and has inputs, outputs, variables, and processing appropriate to the problem at hand, a critic hierarchy (a TMK hierarchy) deals with the structure of other hierarchies. That is, a critic deals with inputs, outputs, variables, tasks, methods, procedures, etc. Therefore, a critic has input parameters and desired output parameters, where the desired output parameters identify the processing to be performed. The procedures for a critic include actions that examine another hierarchy, and more particularly, the target hierarchy may be represented as records in a relational data base. Each element of the target hierarchy, e.g., a method or task, generally has a specific data format and content. Therefore, the actions of the procedures for the critic retrieve the database records for one or more elements in the target hierarchy. Once retrieved, the data base records are available for examination, comparison, calculation, alteration, or other processing. Thus, a critic is generally a TMK hierarchy having tasks, subtasks, methods, and procedures associated with actions. The procedure actions access the database records of a target hierarchy to examine or modify the target hierarchy according to the processing results of the critic hierarchy. Further, the critic may have or operate as an interactive interface to a user, i.e., the critic can interact with the user by displaying information and accepting user input. The critic may also display one or more proposed changes to the target hierarchy and accept a response selecting to make the proposed change or not.

A critic is generally entered into the software component of the invention as a hierarchy, using the hierarchy entry tools and techniques. The processing of the hierarchy includes the examination and possibly the altering of other hierarchy elements, such as tasks, methods, or procedures. In order to examine other hierarchies, the critic has available procedures which retrieve, inspect, and alter the target hierarchy's elements. For example, a critic could examine a hierarchy for "dead branches", parts of the hierarchy which are not connected to any other part, or to which processing could not proceed because of logical errors within the hierarchy, for example, where entry to the hierarchy branch is conditional on a certain variable being true and there is no place in the hierarchy where the variable is set to true. This critic would need access to the parent-child relationships of all elements in the target hierarchy, and variables, and all conditional processing to conduct this type of analysis or reflection.

In one exemplary embodiment of the invention, the following data (noted below) may be provided to the critic. Once the data is entered, the critic hierarchy may be examined, tested, debugged, documented, altered, and/or amended, as with any other entered hierarchy. When complete, the critic may be run as a knowledge hierarchy to solution, which is generally the normal processing of knowledge hierarchies in such knowledge systems. Therefore, in at least one embodiment of the invention, the solution of a software critic hierarchy may include at least one of the following: Interactions with the operator, for example, messages, selection of choices presented; A list of possible or recommended corrections or improvements for the operator to select for implementation; and Changes to the hierarchy without operator interaction; Messages, activity logs, reports for review.

Figure 2:
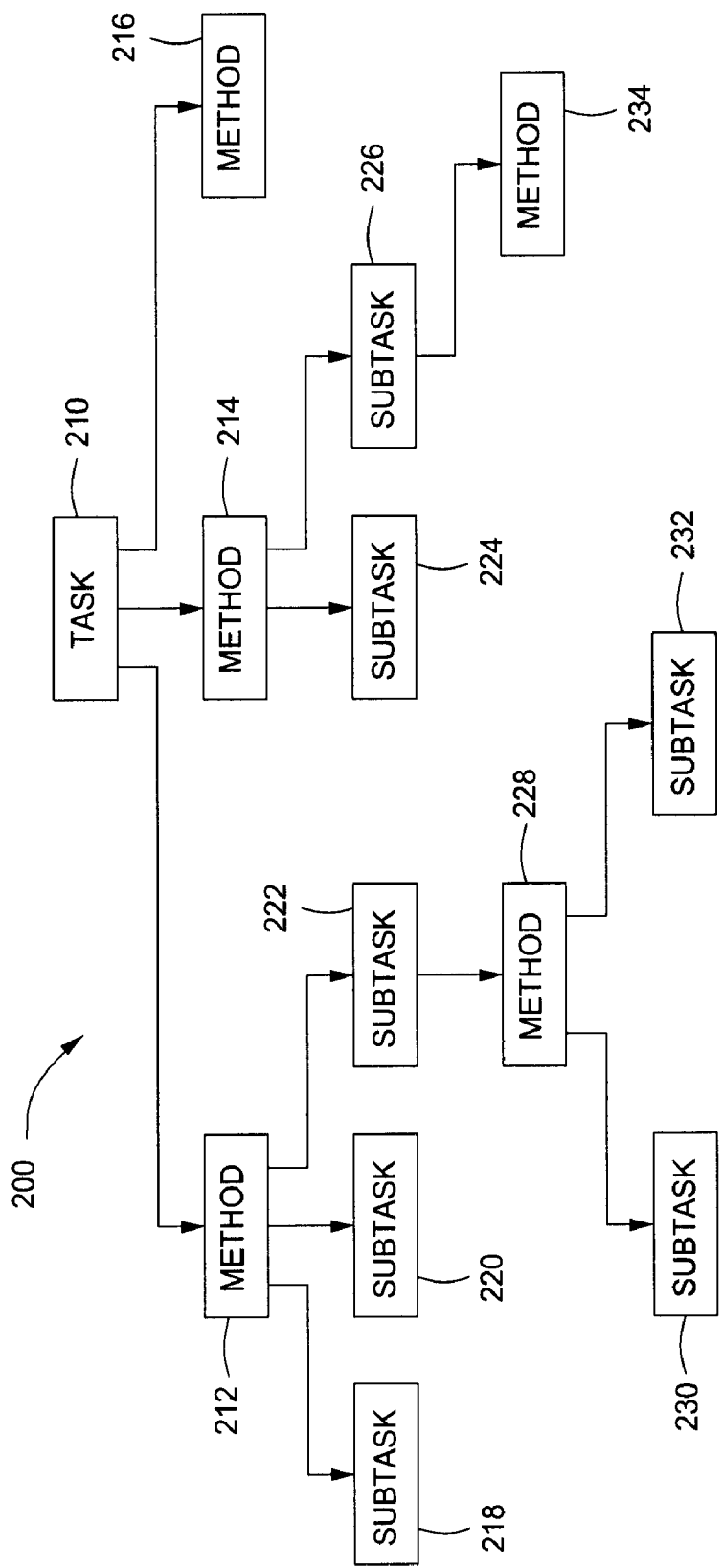
FIG. 2 illustrates an exemplary TMK hierarchy of tasks, methods, and subtasks.

Embodiments of the invention may be implemented as a set of components which make available the elements of a TMK hierarchy. For example, FIG. 2 illustrates an exemplary TMK hierarchy of a task, methods, subtasks, sub-methods, and the subtasks associated with the sub-methods. In FIG. 2, a TMK hierarchy is illustrated by a tree of nodes 200. The tree 200 includes a primary task 210, which represents a high-level problem to be solved. The solutions to the primary task are embodied in methods 212, 214, and 216. In general, a TMK hierarchy may include any number of high-level task nodes. Methods 212, 214, and 216 represent three approaches to solving the task 210. Subtasks 218, 220, and 222 may provide input to method 212 as alternative approaches or as providing data that when combined with the data of the other subtasks satisfies method 212. Subtasks may themselves have methods which may have child subtasks, where the processing of a subtask involves the processing of associated subtasks. Similarly, subtasks 224 and 226 provide input to method 214. Method 216 has no subtasks, and as such, is generally called a "procedure," which is an atomic method or a process that does not spawn subtasks and may be an algorithm, a database retrieval, a request for user information, or a similar process. In a similar fashion, method 228 solves subtask 222, having itself subtasks 230 and 232. The TMK hierarchy may be extended by adding additional methods having subtasks and/or subtasks having methods or procedures.

The TMK hierarchy illustrated by tree 200 utilizes what is generally known as "strategic" knowledge that applies the thought process of an expert to attack and solve a problem. Arriving at a solution may include identifying inputs to each of the tasks and identifying initial states, values, parameters, and knowledge. A knowledge engine processing the tree 200 will generally begin at the main or primary task and attempt to find one or more solutions using the initial values and associated methods/procedures. If the problem is not solved directly, it may be broken down into subtasks, where each subtask includes one or more methods or procedures and is processed to find a solution to that particular subtask. For example, the high-level task 210 may be to design a new device. The task 210 may include a specific goal or may be bounded by a set of parameters. More particularly, the task 210 may be to design a device using less of a particular resource. In this way, the task 210 may be defined by one or more desired features or properties. This high-level task 210 may be associated with several possible methods 212-216 leading to a solution of providing the desired design. The method 212 may reach a solution by designing an original device, while the method 214 may involve modifying a current design. The method 216 may look at designs of related or unrelated devices and ways to modify them into the desired device. Each method 212-216 may have inputs, and accordingly, the method 212 may have as inputs a number of standard device specifications. The method 214 may have current designs as input, while the method 216 may have designs of other devices as input. Likewise, each method 212-216 may include outputs, such as with the present exemplary embodiment where the output is the solution of providing a new device design.

Each method 212-216 may be further broken down into subtasks/methods 218-234. The output of each subtask/method 218-234 may be the solution to the high-level task 210, input to a method, or input to another subtask. In the present exemplary embodiment, the subtask 218 may design a particular component of the desired device. The subtask 220 may design another component of the device and may provide input to the subtask 218. The subtask 222 may design another component of the device that is configured to activate the device itself. The method 228 and subtasks 230, 232 may provide additional input into the design of the device in subtask 222. The subtask 224 associated with the method 214, may be to find current device designs. This subtask may have methods (not shown) of using existing knowledge or may have several methods of acquiring the knowledge.

Figure 3:
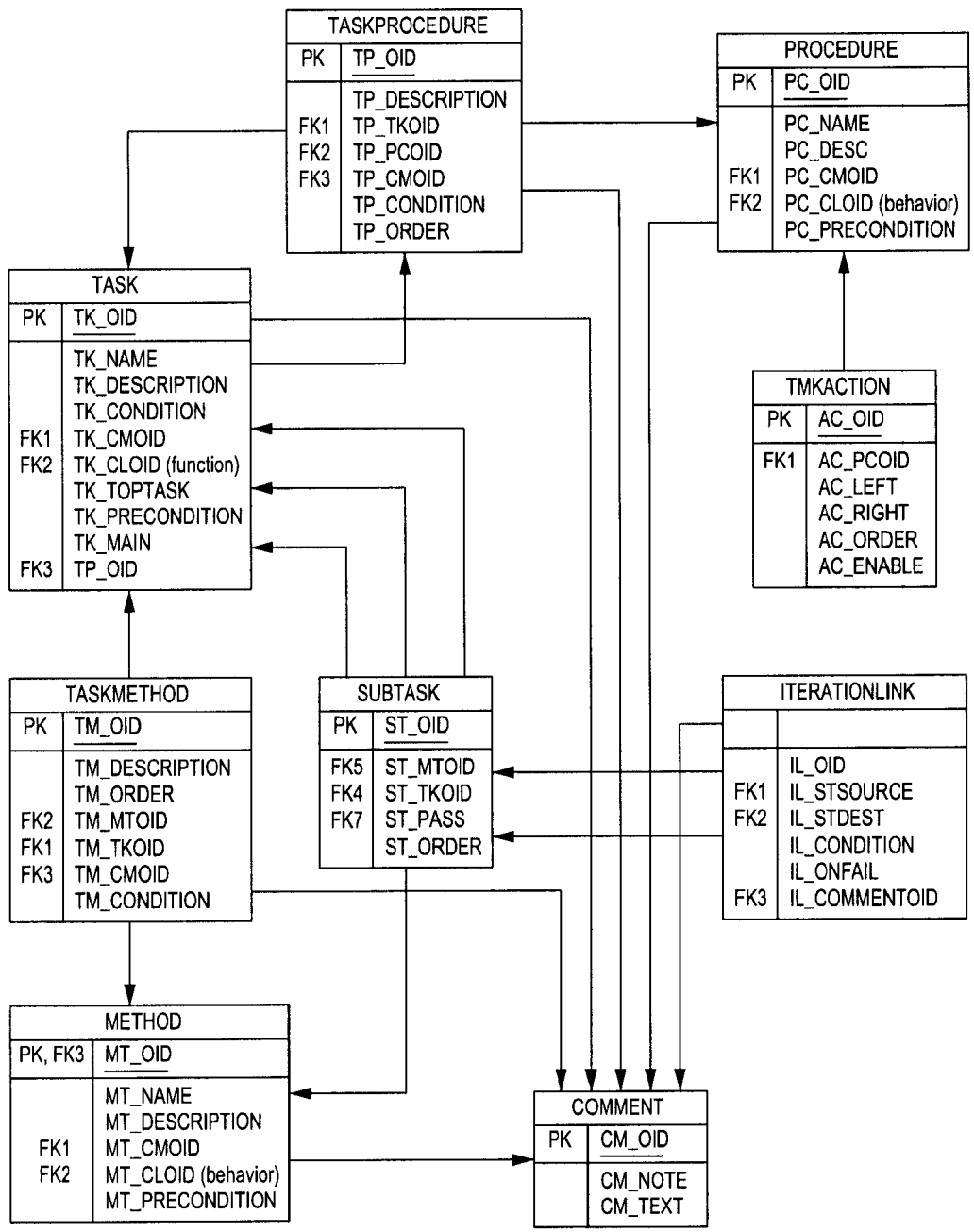
FIG. 3 illustrates an exemplary data base structure for TMK hierarchies, showing the data and the relationships between the data.

Further, FIG. 3 illustrates an exemplary data base structure for TMK hierarchies of at least one exemplary embodiment of the invention, showing data and relationships between the data. At least one embodiment of present invention provides processing calls that can be used in critics to retrieve, examine, change, delete, and add to the data of the target hierarchy. The data is retrieved, changed, deleted, and added using standard data base processing commands. Various components of at least one embodiment of the present invention may be represented in software or methods as calls to functions that are configured to manipulate the data, including the target hierarchy, and make the data of the target hierarchy available to computer logic numeric processing, string manipulation, or logical comparisons.

Figure 5:
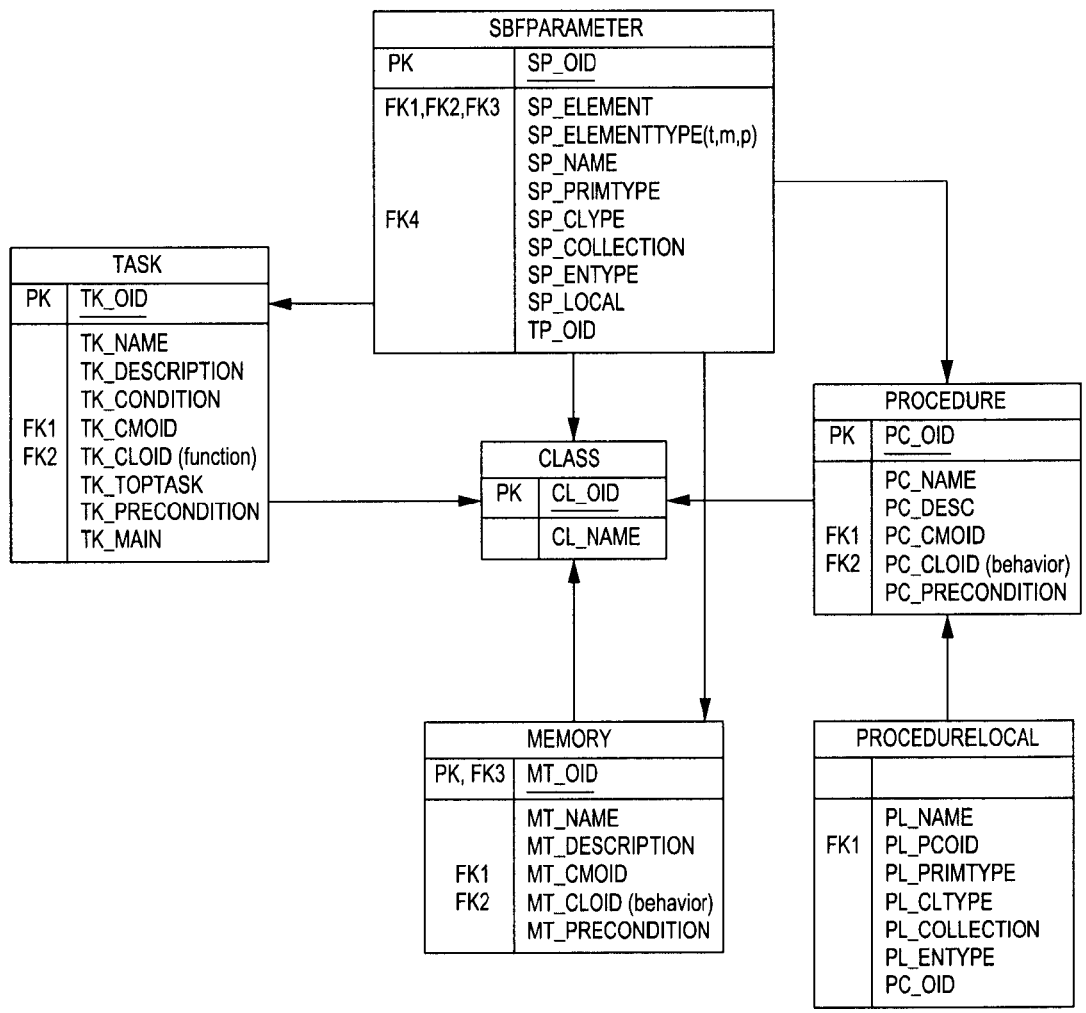
FIG. 5 illustrates one exemplary structure of a relationship between methods, tasks, and procedures and their inputs and outputs.
Figure 6:
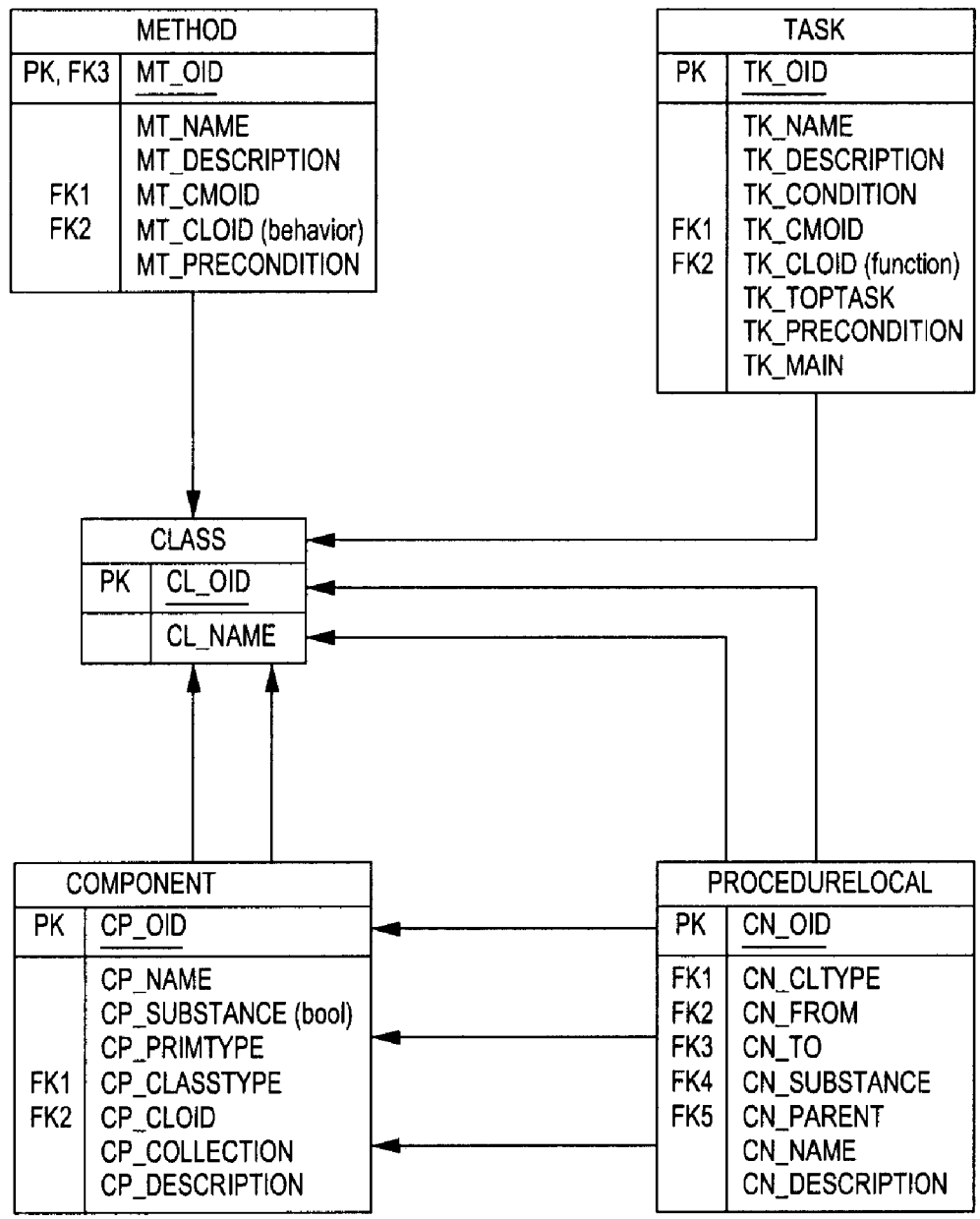
FIG. 6 illustrates further exemplary relationships between the elements of a TMK hierarchy.

Generally speaking, the method or process of various embodiments of the present invention is not available to traditional programming languages, nor to hierarchies written in traditional or customary programming languages. However, in embodiments of the present invention, a TMK hierarchy can be contained in data bases and are not merely typographical lines of code, and as such, the TMK hierarchy may be retrieved, examined, and possibly altered using the components of various embodiments of the present invention. For example, FIGS. 4a and 4b illustrate a plurality of exemplary software function calls that may be implemented in various exemplary embodiments of the present invention. The table shown in FIGS. 4a and 4b is intended to be a continuous list of function calls, and the use of two separate tables to illustrate the entirety of the exemplary software function calls is not intended in any way to separate or delineate the function calls illustrated in FIGS. 4a and 4b. Further, FIG. 5 illustrates one exemplary structure of a relationship between methods, tasks, and procedures and their inputs and outputs, and FIG. 6 illustrates further exemplary relationships between the elements of a TMK hierarchy that may be used by various embodiments of the invention.

In another exemplary embodiment of the invention, the target hierarchy is diagnosed by a method or software process of the invention. In this exemplary embodiment, in the knowledge system entry, it is possible to leave part of a model incomplete. As such, in order to make the model complete, all tasks must have at least one child element, either a method or a procedure, specifying how to accomplish that particular task. Therefore, a critic of the present invention could be used to diagnose the target model to find parts of the hierarchy that are incomplete.

In the present exemplary embodiment, the process or method of using a critic to diagnose a target model to find parts of the hierarchy that are incomplete may include a new hierarchy being added for the critic model, and a new method being added to the top task of the hierarchy. Additionally, a new subtask may be added to the methodology, a new procedure may be added to the subtask, and the new procedure calls "GetTasks(String projectName)" (for example) to get the names of all the tasks in the target model may be used. A second subtask may then be added to the method, and a new procedure may be added to the second subtask. Thereafter, an iteration link may be added to the second subtask so that the subtask and its procedure are executed once for each of the task names returned. Then the second procedure calls "GetTaskChildMethods(String projectName, String taskName)" and "GetTaskChildProcedures(String projectName, String taskName)" (for example) for the next task name in the list of names returned. The procedure adds the task name to a list of tasks that are incomplete, if these functions both return an empty list. When these have been added to the hierarchy, it is run starting at the top task of the hierarchy and the method or software process of the invention will report a list of incomplete tasks in the target model.

In a previous exemplary embodiment, a possible cause of a hierarchy being incomplete was when a task does not have any children. However, there are other cases of a model being incomplete, such as when a method does not have any children. In this situation, a critic could be used to not only diagnose parts of the model that are incomplete, but also to explain why the part is incomplete. In this exemplary embodiment, such as critic may be created using the following methodology. For example, the hierarchy, such as the hierarchy discussed in previous exemplary embodiments, may be created, and a third subtask may be added to the method and a new procedure may be added to the new third subtask. Procedure calls, such as the new procedure calls "GetMethods(String projectName)" may be used to get the names of all of the methods in the target model. A fourth subtask may be added to the method, and a new procedure may be added to the fourth subtask. An iteration link may be added to the fourth subtask so that the subtask and its procedure are executed once for each of the method names returned in the previous operation, and the procedure calls "GetSubtasks(String projectName, String methodName)" may be used to obtain the next method name in the list of names returned in the previous operation. The procedure adds the method name to a list of methods that are incomplete, if this function returns an empty list. When these operations have been added to the hierarchy, it is run starting at the top task of the hierarchy. A separate list is generated for incomplete tasks and incomplete methods, and for each of these incomplete parts, the user is given the location within the hierarchy and a message explaining the reasons for the part being incomplete so that the user may trouble shoot the problem. This obviously provides a powerful tool for users, as the entire hierarchy does not need to be manually debugged to find an incomplete method. The system and method of embodiments of the invention automatically tests the hierarchy, locates problems, and identifies the located problem to the user for correction. In other embodiments of the invention, the method or process of the invention may further include the critic autonomously making changes to the hierarchy to correct problems identified, without user action being required.

In another exemplary embodiment of the invention, consider a hierarchy that has the purpose of controlling a mechanical device, such as robot in an obstacle course, for example. One problem in this scenario is that the robot (and hence, the hierarchy) is confronted with is how to deal with obstacles in the middle of its path. It solves the problem by finding a route around the obstacle. Suppose the robot now encounters a new problem: it is travelling in a confined space and comes to an obstacle that spans the width of the confined space. In this scenario, a hierarchy that attempts to find a route around the obstacle will fail. Therefore, in the present exemplary embodiment of the invention, a critic model may be created to adapt the target model to address this new scenario. The critic may be created by a new hierarchy being created for the critic model, a new procedure may be added to the top task of the hierarchy, and the procedure may call three functions: AddProcedure (String projectName, String procedureName), AddAction (String projectName, String procedureName, String left, String right, String description), and AddProcedureToTask (String projectName, String projectName, String procedureName, String taskName, Boolean mapParameters). These calls create a new procedure in the target model with the action necessary to cause the robot to attempt to go over the obstacle, as opposed to the logic in the previous hierarchy that only provided for the robot to go around the obstacle. When these procedure calls have been added to the hierarchy, the hierarchy is run starting at the top task of the hierarchy. The critic modifies the target model by adding a new procedure that will be an alternative way of dealing with obstacles, and this modified form of the target model can then be executed. During execution, if the hierarchy cannot successfully find a route around an obstacle, then it can have the robot attempt to go over the obstacle, such as by jumping over the obstacle.

In another exemplary embodiment of the invention, a critic model can also be used to repair a hierarchy when a problem occurs. For example, one simple problem that may occur during the creation of a hierarchy is the renaming of a parameter. Parameters are used to pass information through the elements in the hierarchy from parent to child (and vice-versa), and normally when a parameter is added it is also automatically added to all its children and their children. But when the user renames the parameter, all places where the parameter is used must also be renamed in order to maintain the flow of information. This can be a time-consuming and error prone process for the user. In an exemplary embodiment of the invention, a critic model can streamline the process of changing a parameter name.

For example, in a simple case, the critic model may operate to create a new hierarchy for the critic model to address this type of problem. In this example, a new procedure is added to the top task of the hierarchy, and the procedure calls DeleteTaskParameter (String projectName, String taskName, String parameterName, Boolean trickleDown) using the old name of the parameter, Add ParameterToTask (String projectName, String taskName, String parameterName, String type, Boolean is Collection, Boolean addToChildren) using the new name of the parameter, and SetTaskParameterMapPath (String projectName, String methodParentName, String taskName, String parameterName, String mapPath, Boolean mapToPriorSubtask) to connect the new parameter to the old one above it, are added to the hierarchy. When these have been added to the hierarchy, the hierarchy is run starting at the top task of the hierarchy, and the critic hierarchy takes as input the name of task that has the parameter, the current name of the parameter, and the new name of the parameter. Based on this input, the critic renames the parameter in the hierarchy to be consistent with the original renaming conducted by the user, which prevents the user from having to manually conduct a global search and replace operation on the hierarchies to correct the variable renaming issues.

In another exemplary embodiment of the invention, in the process of creating a hierarchy, parameters may be added to large sections of the hierarchy, and often times the parameters are not used by parts of the hierarchy. Therefore, these extraneous elements may create confusion to a human reader and inefficiencies in processing the hierarchy to a solution. In this scenario, the hierarchy can be optimized by removing extraneous parameters from tasks, methods, and procedures where they are not used. In a simple exemplary case limited to only removing one unused parameter from procedures, a critic is created where a new hierarchy is created for the critic model, a new method is added to the top task of the hierarchy, and a new subtask is added to the method. A new procedure is added to the subtask, and the procedure calls GetProcedures (String projectName) to get the names of all the procedures in the target hierarchy. A second subtask is added to the method, a new procedure is added to the second subtask, and an iteration link is added to the second subtask so that the subtask and its procedure are executed for each name from the previous step. Procedure calls GetActions (String projectName, String procedureName) to get a list of the actions of the next procedure from the list produced in the previous steps are added. A third subtask is added to the method, a new procedure is added to the third subtask, and an iteration link is added to the third subtask so that the third subtask and its procedure are executed for each action from the previous step. The procedure call StrFind (String stringToSearch, String stringToFind) to find if the parameter name is used in the next action from the list produced in the previous step is used, and if it is not used in any of the actions, then it procedure call DeleteProcedureParameter (String projectName, String procedureName, String parameterName) to remove the parameter from the next procedure from the list produced in the earlier step is used. When these have been added to the hierarchy, it is run starting at the top task of the hierarchy, and the critic hierarchy takes as input the name of the parameter to search for, and it removes the parameter from any procedures that do not use the parameter. This critic is extendable to do the same type of operation for any method or task, and also to search for all parameters in the model.

In another embodiment of the invention, another use of the exemplary critic model of the invention is to use it to build other models based on some input. In this case the result of the critic will be a new model, which will generally be either a process hierarchy or a knowledge structure. One use is to create a model of a family tree. For example, suppose there is a database of family relationships of the form "Mary Smith is the daughter of Susan Smith." The critic model would interpret the database relationships and build a knowledge base to represent them. In a simple case, without the details of interpreting the database structure, a critic may be created by generating a new hierarchy for the critic model, adding a new method to the top task of the hierarchy, and adding a new subtask to the method. A new procedure is added to the subtask, an iteration link is added to the subtask so that the subtask and its procedure are executed for each person from the database. The procedure calls AddComponent (String projectName, String className, String memberName, String type, Boolean is Collection) to add a component to the class structure that matches the name of the person, e.g. "Mary Smith" is used, and the type is used to represent some characteristic such as gender. A second subtask is added to the method, a new procedure is added to the second subtask, and an iteration link is added to the second subtask so that the subtask and its procedure are executed for each relationship from the database. Additional procedure calls AddConnection (String projectName, String className, String connectionName, String type, String fromMemberName, String toMemberName, String substanceName) are used to add a connection between two nodes in the model. This connection represents the relationship between two people in the originally entered family, and in this case, the type could be used to represent the type of the relationship, e.g., "child of." When these have been added to the hierarchy, it is run starting at the top task of the hierarchy, and the model would import the data from a database and build a representation of the family tree as a knowledge base. This knowledge base could then be viewed by a user and used by other TMK hierarchies.

Figure 7:
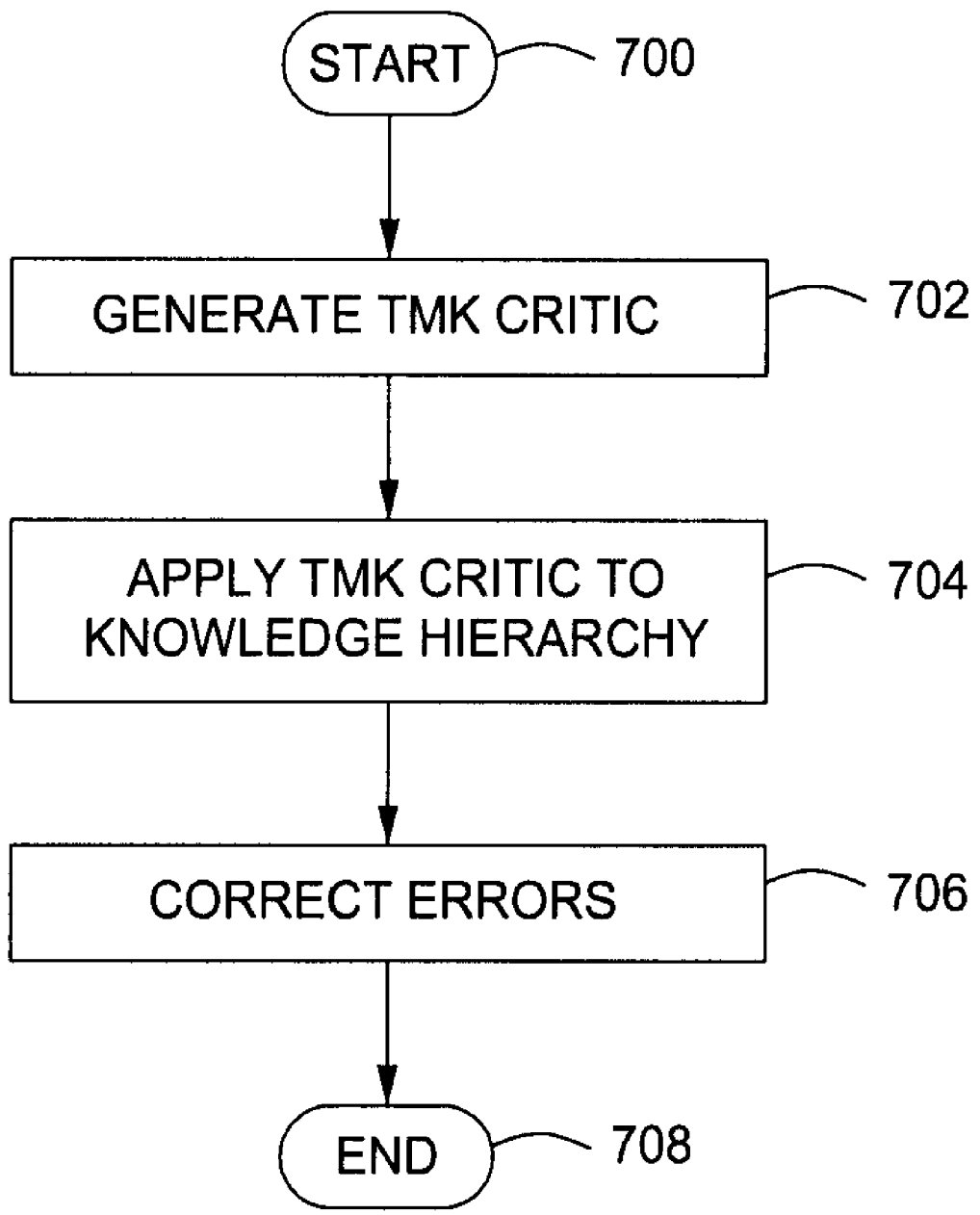
FIG. 7 illustrates a flowchart of an exemplary method of an embodiment of the invention.

FIG. 7 illustrates a flowchart of an exemplary method of an embodiment of the invention. The exemplary method of the invention begins at step 700 and continues to step 702, where a TMK critic configured to analyse a knowledge hierarchy is created. The creation of the TMK critic (or a non-TMK type critic) is described above in at least one of the exemplary embodiments of the invention. The method then continues to step 704, wherein the TMK critic is applied to the knowledge hierarchy to determine errors, where the errors may be any sort of error or problem with the hierarchy that causes the hierarchy not to perform as desired. The application of the critic to the knowledge hierarchy is described above in at least one of the exemplary embodiments of the invention. Once the errors are identified, the method continues to step 706, where the identified errors are corrected. The correction of the errors may be conducted by the critic, or alternatively, the error may be identified to a user that may then manually correct the error. The correction of the errors in the knowledge hierarchy is described above in at least one of the exemplary embodiments of the invention. Once the errors have been corrected, the exemplary method of the invention ends at step 708.

In at least one exemplary embodiment of the invention, a method or software process if provided where a target hierarchy including elements of tasks, methods, procedures, variables, and other elements and relationships between elements, all of which are stored in a data base available to a critic hierarchy that is configured to conduct any one or combination of the above noted functions, processes, or operations. Additionally, the exemplary critic hierarchies discussed herein may include elements of tasks, methods, procedures, variables, and other elements where the procedures include calls to components which retrieve, examine, update, delete, change, and/or add to a target hierarchy data base or record. The critic hierarchy may also include the standard processing for logical, mathematical, character and string functions.

As such, the foregoing outlines features of several exemplary embodiments of the invention so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A method for examining a first task-method-knowledge ("TMK") hierarchy, comprising:
    generating a second TMK hierarchy, wherein the second TMK hierarchy is configured to retrieve and examine the first TMK hierarchy; and
    processing the second TMK hierarchy to a solution on the first TMK hierarchy to identify errors in the first TMK hierarchy.

2. The method of claim 1, further comprising representing the first TMK hierarchy as a plurality of records in a database.

3. The method of claim 1, wherein the first TMK hierarchy has at least a first element and a second related element, where the first element includes at least one of a task, subtask, method, procedure, and action.

4. The method of claim 1, wherein the first TMK hierarchy has a related class structure, the class structure including a member having a member type, the member type selected from a component, connection, and substance.

5. The method of claim 4, wherein the member has a data type, the data type selected from the set of integer, real, string, time, date, duration, file, Boolean, collection, and class structure.

6. The method of claim 4 wherein the class structure is stored in a data base as a record.

7. The method of claim 3, wherein the first element, the second element, and the relationship between the first element and the second element are stored in a database as records.

8. The method of claim 1, wherein generating the second TMK hierarchy comprises:
    creating a TMK hierarchy having a top task;
    adding a method as a child of the top task;
    adding a subtask as a child of the method;
    adding a procedure as a child of the subtask;
    adding an action as a child of the procedure, the action retrieving a record from a database;
    examining the retrieved record;
    making a determination based on the examination of the record;
    providing a result based on the determination; and
    altering the processing of the second TMK hierarchy based on the result.

9. The method of claim 8, wherein altering the processing of the second TMK hierarchy based on the result further comprises:
    adding an iteration link as a child of the subtask to retrieve a subsequent record from the data base;
    examining the subsequent record;
    making a further determination; and
    providing a further result and alter the processing of the second TMK hierarchy based on the further result.

10. The method of claim 8, wherein the secone TMK hierarchy is configured to conduct an operation that alters the first TMK hierarchy by writing a record to a database representing the first TMK hierarchy, altering the related class structure by writing a record to the database representing the class structure, and writing a line to a report or issuing a message to a human operator.

11. The method of claim 8, wherein an additional element selected from a task, subtask, method, procedure, action, and class structure is added to the second TMK hierarchy such that the resulting second TMK hierarchy examines the first TMK hierarchy and provides a tangible result in the form of a report or an alteration to the first TMK hierarchy or related class structure.

12. The method of claim 1, wherein processing the second TMK hierarchy to a solution on the first TMK hierarchy comprises:
    starting execution at a top task in the first TMK hierarchy;
    selecting and processing an action that is a descendent of the top task, where the processing of the action produces a result;
    selecting and processing a subsequent element of the second TMK hierarchy based on the result produced by the action; and
    repeating the selecting and processing operations to process a subsequent element until a determination to stop processing is made based on the result of a subsequent action, the determination providing a solution to the second TMK hierarchy.

13. A computer program embodied on a non-transitory computer readable medium, that when executed by a computer processor, is configured to control a method for examining a first task-method-knowledge ("TMK") hierarchy, wherein control of the method comprises:

representing the first TMK hierarchy as a plurality of records in a database;

representing a second TMK hierarchy as a plurality of records in a database, the second TMK hierarchy including at least one of tasks, subtasks, methods, procedures, actions, and class structures;

the second TMK hierarchy retrieving and examining at least one database record representing the first TMK hierarchy;

providing a solution to the second TMK hierarchy by making a determination based on the examination; and displaying a result to a user based on the determination.

14. The computer program recited in claim 13, wherein the displayed result is a printed report.

15. The computer program recited in claim 13, wherein the result is a modification of the first TMK hierarchy, the modification being made by writing at least one record to the database representing the first TMK hierarchy.

16. The computer program recited in claim 13, wherein the second TMK hierarchy has a top task and a solution to the second TMK hierarchy is provided by the computer program initiating execution of the second TMK hierarchy at the top task.

17. A method for examining a first task-method-knowledge ("TMK") hierarchy for errors, comprising:

entering and storing the first TMK hierarchy as records in tables in a relational database;

examining the records with a second TMK hierarchy to detect errors in the records, wherein the second TMK hierarchy modifies the records representing the first TMK hierarchy to correct an error detected in the first TMK hierarchy.

18. The method of claim 17, wherein the rrrors comprise at least one of dead branches, incomplete models, and improperly named variables.

19. The method of claim 17, wherein at least one of the examining and the modifying comprises executing at least one procedure call by the second TMK hierarchy.

20. The method of claim 17, wherein the modifying the records representing the first TMK hierarchy with the second TMK hierarchy comprises repairing an un-operational first TMK hierarchy.

* * * * *